United States Patent [19]

Lee

[11] Patent Number: 4,844,172
[45] Date of Patent: * Jul. 4, 1989

[54] PODDED CLEAT HORSESHOE

[76] Inventor: James M. Lee, 351 Warwick Ave., South Orange, N.J. 07079

[*] Notice: The portion of the term of this patent subsequent to Oct. 14, 2003 has been disclaimed.

[21] Appl. No.: 84,015

[22] Filed: Aug. 11, 1987

[51] Int. Cl.$^4$ .............................. A01L 5/00; A01L 7/06
[52] U.S. Cl. ...................................................... 168/13
[58] Field of Search ........................ 168/12, 13, 15, 26, 168/28, 29

[56] References Cited

U.S. PATENT DOCUMENTS

| | | |
|---|---|---|
| 43,747 | 8/1864 | Griswold . |
| 331,628 | 12/1885 | Gardner . |
| 516,788 | 3/1894 | Von Eulenfeld . |
| 667,262 | 2/1901 | Stroud et al. ........................... 168/13 |
| 738,639 | 9/1903 | Spadone ................... 168/13 |
| 832,162 | 10/1906 | Rothwell et al. . |
| 839,432 | 12/1906 | Smith ................................. 168/13 |
| 844,121 | 2/1907 | Goodwin . |
| 863,386 | 8/1907 | Hallanan ............................... 168/28 |
| 965,594 | 7/1910 | Moffett et al. ......................... 168/13 |
| 1,019,493 | 3/1912 | Kyle . |
| 1,089,965 | 3/1914 | Richard . |
| 1,100,670 | 6/1914 | Curley .................................... 168/28 |
| 1,131,858 | 3/1915 | O'Neill . |
| 1,187,666 | 6/1916 | Slaninka ................................ 168/13 |
| 2,024,265 | 12/1935 | Anderson et al. ..................... 168/13 |
| 3,090,718 | 4/1963 | Dixon ............................... 168/13 X |
| 4,122,900 | 10/1978 | Barr et al. .............................. 168/12 |
| 4,207,947 | 6/1980 | Cope et al. ......................... 168/4 X |
| 4,616,709 | 10/1986 | Lee ........................................ 168/13 |

Primary Examiner—Robert P. Swiatek
Attorney, Agent, or Firm—Fleit, Jacobson, Cohn, Price, Holman & Stern

[57] ABSTRACT

A novel shock-absorbing and protective horseshoe comprises a composite shoe that conforms to the shape of the perimeter of the horse's hoof, and from which protrude podded cleats strategically aligned and positioned below the horn of the hoof for providing the prerequisite support for the horse. Each podded cleat has an internal air chamber, which when combined with the complying shape of the external wall partially or fully collapses or deflates the transition of material during collapse, provides a most significant degree of cushioning, thus allowing a relatively high durometer elastomer for the composition of the cleats that would not otherwise provide sufficient compressibility, but has physical properties that surmount the factors of abrasion and wear. Such hard materials are identifiable as having a low frictional resistance in comparison to highly compressible, soft elastomers. The action of the podded cleats innward, upward mechanical collapse, which is enhanced with the memory retention of given elastomeric compounds thus allowing the podded cleat to recover its origianl shape and dimensional form upon release of the load. Reinforcing or heavy wear pads are provided at the heel and toe portions of the horseshoe which are the areas of highest abrasion and wear. The horseshoe consists of a metal plate covered by and embedded in an elastomeric material to form a laminated structure.

20 Claims, 2 Drawing Sheets

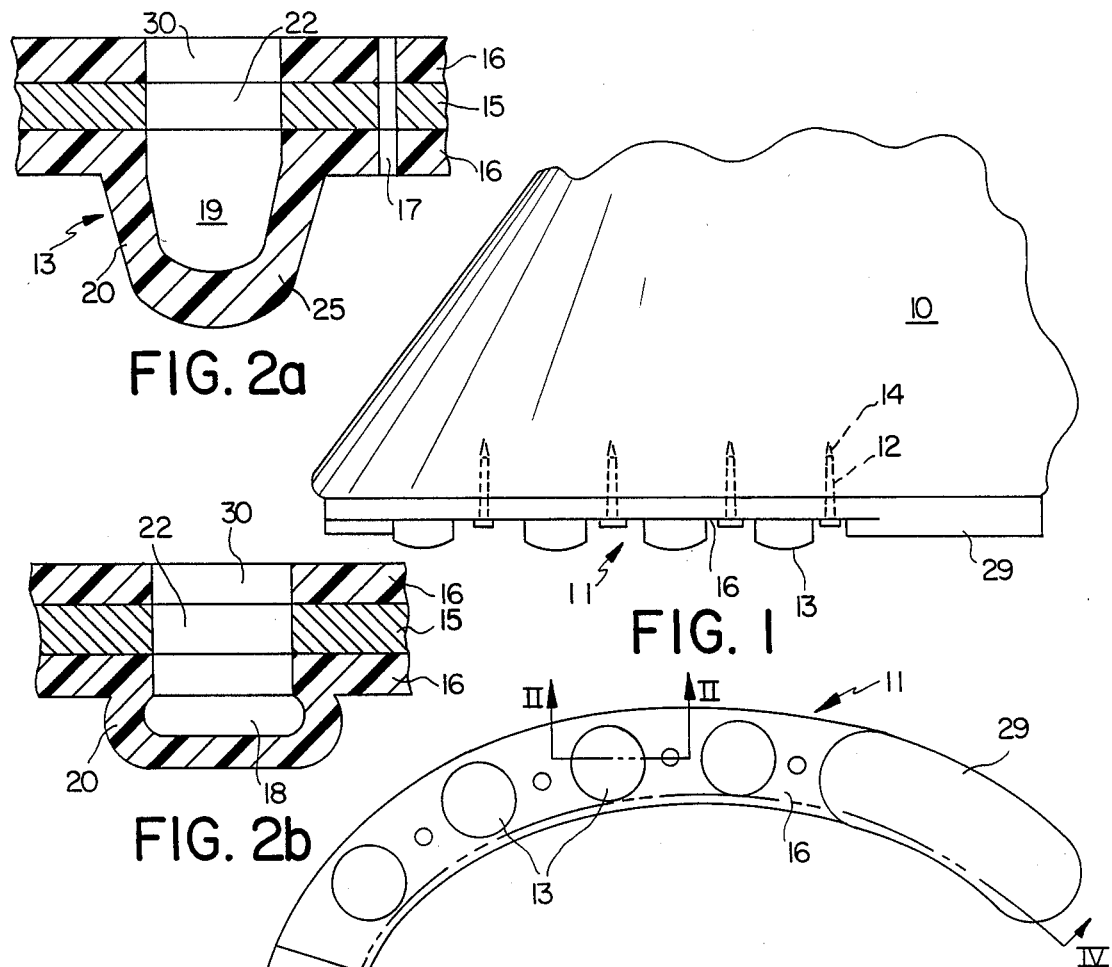
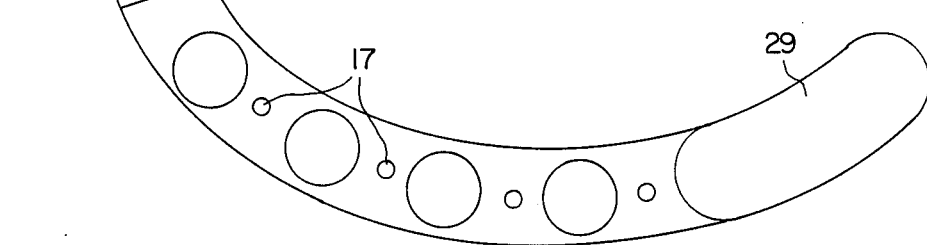
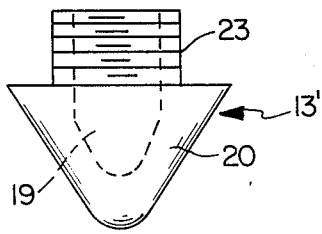
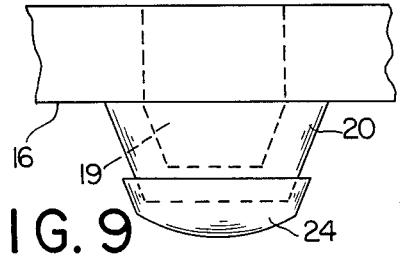

PODDED CLEAT HORSESHOE

BACKGROUND OF THE INVENTION

1. Field of the Invention

This invention relates to horseshoes, and in particular to a type of horseshoe that can provide a cushioning effect that is not determined by the compressibility of any given material, but by the application of a design where the occurrence of a displacement of material provides a means of reduction of impact while maintaining an integral, supportive structure, and is reinforced at the toe and heel portions by wear-resistant pads.

2. Description of the Prior Art

The type of horseshoes in use that have the objectives of providing a cushioning effect are generally formed of a molded polymeric elastomer or rubber-based elastomeric compound, and such horseshoes consist of a solid cross section of material. The ability of such horseshoes to absorb impact is based exclusively upon the physical properties of the elastomer to compress under load and thusly achieve a means of a cushioning effect. In order to pursue any considerable degree of longevity, and to provide a fairly high resistance to abrasion, such horseshoes are generally formed of elastomers that are dense, hard materials and as a result of the hardness of the elastomeric compound the action of material compression is severely diminished and the cushioning effect for a horse's hoof is negligible.

A new horseshoe that overcomes the problems of prior art horseshoes by providing a shock absorbing and protecting form of horseshoe is described in my earlier U.S. Pat. No. 4,616,709 and comprises essentially a base that conforms to the shape of the perimeter of the horse's hoof, and from which protrude a series of podded cleats that are strategically aligned and positioned below the horn of the hoof providing the prerequisite support for the horse. Each podded cleat has an internal air chamber, that when combined with the complying shape of the external wall allows partial or full collapse or deflation of this structural element effecting a most significant degree of cushioning, thus allowing a relatively high durometer elastomer to be used that would not otherwise provide sufficient compressibility, but has physical properties that surmount the factors of abrasion and wear, such hard materials being identifiable as having a low frictional resistance in comparison to highly compressible, soft elastomers. The action of the podded cleat is the inward, upward mechanical collapse, which is enhanced with the memory retention of given elastomeric compounds thus allowing the podded cleat to recover upon release of load and reattain its original shape and dimensional form.

BRIEF SUMMARY OF THE INVENTION

It is a principle object of the invention to provide a horseshoe that is capable of compression under load by design independent of the physical characteristics of that material that would allow for compression. The functions of the horseshoe's podded cleats to momentarily collapse upon impact and to have such formed sections regain their full shape and form allow for a more substantial cushioning effect than could otherwise be accomplished solely through material compression.

It is another object of the invention to form, as an integral part of the horseshoe, a series of podded cleats that protrude downwardly from the base of the shoe so that each protruding section shall provide initial contact with the ground, that each podded cleat shall be collapsible by the design wherein the structure is formed to have the internal chamber allowing the surrounding wall to be displaced inwardly, and that the wall of the cleat shall resume the shape and form of the original configuration upon release of load due to the memory retention properties of the given elastomeric compounds.

A further object of the invention is to provide such a podded horseshoe with heavy duty or reinforced portions at the toe and heel for increased wear resistance, and in some cases increased gripping effect, in these areas.

These objects are achieved by this invention in which a significant level of cushioning effect is produced within and by a horseshoe. The mechanics of the system, comprising the horseshoe, for diminishing the degree of impact is through the creation of podded cleats as an integral section of the formed horseshoe, so that each of the cleats will partially, or fully, collapse inward due to the chambered design.

The objective of providing compressible cleats which will reassume their original dimensional forms upon release of load and following a compressed state is achievable by the memory retention properties of some elastomeric materials.

This invention provides a means of implementing use of a relatively dense and hard elastomer, that in itself would provide a minimal degree of resiliency through direct compression of the material, and to gain the recognizable low measurement of frictional resistance that dense and hard materials normally afford. It is my intention to directly avoid such elastomeric materials used in the prior art for compressibility under load, which are generally only moderately hard compounds, offer a limited degree of wear, a low resistance to abrasion, and have measurable distortive properties incurring loosening of the components. In a preferred embodiment of the invention, there is provided a structural element for attachment of the horseshoe to the horn of the hoof. By means of a metal plate, to which the elastomeric-formed horseshoe section is permanently bonded, a plurality of nails may be used for affixing the horseshoe to the hoof in the same manner as in the prior art. This metal plate is shaped to the approximate width and contour of the horse's hoof, and through secure attachment of the metal plate to the horn of the hoof using a series of nails, the possibility of the component loosening is substantially less than with horseshoes formed entirely of an elastomeric compound or polymeric material where pliablility and elongation under load result in the horseshoe separating from the hoof. The podded cleats are aligned specifically to achieve support of the horn of the hoof, this being the structural element of the hoof, and to produce an equalized displacement of load through compression of the podded cleats. The podded cleats, each having an internal chamber, may be of a variety of shapes and have multiformity in alignment and number for achieving the desired cushioning effect.

The mechanical design of the cleats allows the displacement of material under impact and load rather than direct compression of the material itself. Each cleat has an internal chamber with a surrounding wall of material, which is preferably a hard, dense elastomer. The cleats may be formed as integral parts of the horseshoe, or may be formed independently of the horseshoe and attached by any suitable method or fastening device in order to achieve the end result which is a mechanical compressiblity action of the horseshoe.

The preferred embodiment of my invention has the additional features of increased wear-resistant pads or reinforcement structures on the toe and heel portions of the horseshoe. These may be formed on the toe, for example, as an enlarged or thickened portion integral with the metal plate. On the heel, they may be enlarged or thickened portions integral with the elastomeric or polymeric material part of the horseshoe formed as pads larger in area than a podded cleat and without an internal chamber, and may be of harder or denser material to provide better wear resistance in these portions of the shoe. These heel pads may also be made separately and attached to the shoe by any suitable means.

In the preferred embodiment the metal plate is completely enclosed in an outer covering of elastomeric or polymeric material to form a laminar shoe which may be done by molding the outer covering around the metal plate. The podded cleats and wear-resistant pads may be formed simultaneously with the molding of the outer covering as integral parts thereof.

BRIEF DESCRIPTION OF THE DRAWINGS

The invention will now be described in detail with reference to the accompanying drawings wherein:

FIG. 1 is a side elevational view of a horse's hoof fitted with a horseshoe in accordance with an embodiment of the invention;

FIG. 2a is an enlarged cross-sectional view taken along line II—II of FIG. 3;

FIG. 2b is a view similar to FIG. 2a showing a poddle cleat when subjected to a compressive force;

FIG. 3 is a bottom plan view of the horseshoe only shown in FIG. 1;

FIG. 8 is an enlarged side elevational view of another embodiment of a podded cleat of this invention; and FIG. 9 is an enlarged side elevational view of another embodiment of a podded cleat fixed in position.

DETAILED DESCRIPTION OF THE PREFERRED EMBODIMENTS

Figure 6:
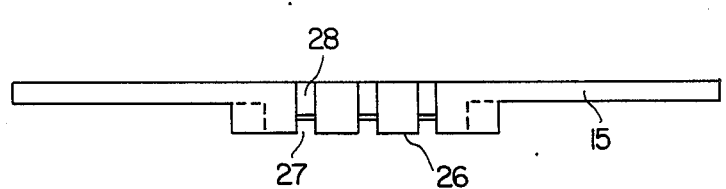
FIG. 6 is a front or toe end view of the metal plate shown in FIG. 5.

Referring to FIG. 1, there is shown, in outline, the structure of a horse's hoof 10, which is comprised of a keratinous substance that constitutes the peripheral region known as the horn. It is the horn that is the structural and supporting member and into which nails are embedded for attachment of the horseshoe, as well known in the prior art. These nails are forced into the substrate of the horn at an angle to assure an outward penetration by the nail through the wall of the hoof, where the end of the nail is to be trimmed and cleated over.

FIG. 1 shows partly in side elevation a multi-element horseshoe 11 attached directly to the base of the hoof 10 with a series of nails 12. In accordance with this invention, the horseshoe has integrally-formed pods 13 that are aligned with the peripheral horn of the hoof for essentially-placed support. It is shown that each nail 12 is inserted through the horseshoe 11 and driven in an upward direction into the horn of the hoof. The ends 14 of these nails are shown to emerge from the hoof at a distance from the horseshoe where such ends are to be trimmed and angled downward to prevent the nail and the horseshoe from loosening and possibly falling off the hoof. An integral part of the horseshoe 11 is a metal plate 15 that is enclosed within an outer covering 16 of elastomeric or polymeric material, the upper layer of which is in direct contact with the bottom of the hoof 10, and conforms with the peripheral contour of the horn. The metal plate 15 is the skeletal system of the horseshoe where the metal contoured plate provides a restraint against lateral forces, and forms the rigid, non-elongating member against which the heads of the nails 12 may be driven to secure the horseshoe to the hoof. By means of chemical bonding during the manufacturing process, a permanent bond occurs between the metal plate 15 and the covering material 16 which complies in shape to the metal plate, producing a laminar structure. From the lower layer of the cover material protrude the podded cleats 13, within each of which is an internal cavity 19. The podded cleats 13 are aligned directly beneath the horn of the hoof to provide the supportive measure necessary for the horse. The cleats may be greater in size or differentiate in other manners to accomplish the cushioning effect where such absorption of impact and stress is critical upon a specific area of the hoof. The drawing is illustrative of the invention as it relates to the placement of the cleats along the perimeter of the hoof without designating a manner of cleat alignment and differences in sizing to improve upon the performance and shock absorption of the horseshoe.

FIG. 2a, which is a cross-sectional view of a podded cleat and the adjacent parts of the horseshoe, shows a podded cleat 13 and nail hole 17 as well as the formation of an internally structured air chamber 19 which extends from the top of the horseshoe through the metal plate 15 and part of the lower layer of the elastomeric cover 16 and well within the form of the cleat 13. The internal chamber is maintained at neither a negative nor positive air pressure level. It does provide a method of methodically displacing the formed material that comprises the surrounding walls 20 under impact and load, which is translated into a means of absorbing shock that is not reliant upon any compressible properties of the material. It is due to the internal cavity 19 that the encompassing wall 20 has a degree of elasticity and memory retention to assure sufficient recovery of the cleat to its given dimensional shape and form when not under compression loading. It is also a prerequisite that the elastomeric material forming the cleat be of substantial hardness to reduce the abrasive wear that a horseshoe is clearly subjected to in use. Such dense compounds would offer negligible compressibility. It is seen in FIG. 2a that the external wall 20 is angled to facilitate a desired form of mechanical collapse, and that the internal chamber 19 has a form that is in compliance and relationship with the outer wall to maintain a consistent thickness of wall section to assure the effect of the mechanical collapse of the cleat under impact and load.

FIG. 2b shows the podded cleat fully subjected to a load-bearing weight causing the internal chamber to distort and permit the wall section 20 of the cleat to collapse in an upward motion. The dispersement, or displacement, of formed material rather than direct compression of the material is illustrated in this figure and is the means of producing the cushioning effect. The distortion caused by the collapse of the cleat does not alter the position of the metal plate 15 nor change the distance between the metal plate and that of the base of the hoof, thus contributing to the securement of the horseshoe through the utilization of nails. The importance of the memory retention of the elastomeric material is emphasized in this figure where the fully compressed and distorted cleat must recover from the compressive state and reattain the original dimensional shape and form of the cleat. Such viscoelastic physical properties are identifiable with a range of elastomeric compounds. Taking the above into account, it is seen that a rubber-based material, such as a high carbon black carboxylated nitrile is highly suitable for the forming of the majority of the horseshoe, although other types of materials may be found equally suitable for this application. Further, the material may be reinforced with fibers such as at 25 for example to, in part, effectively diminish wear under the abrasive conditions that a horseshoe is normally subjected to.

Figure 5:
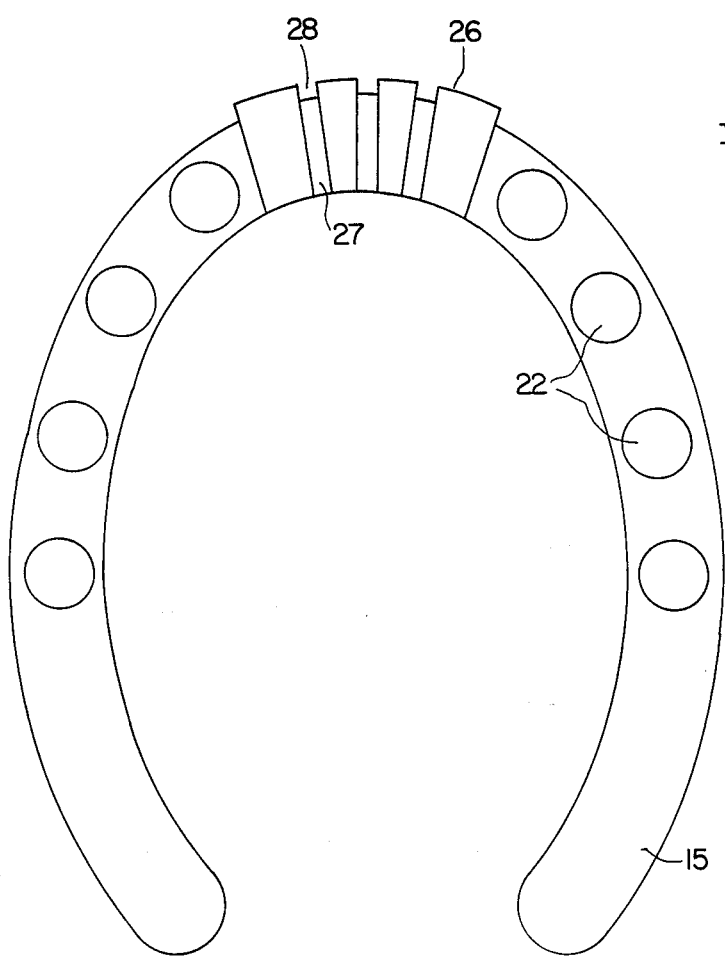
FIG. 5 is a bottom plan view of the metal plate portion only of the invention prior to enclosure in the outer cover.
Figure 4:
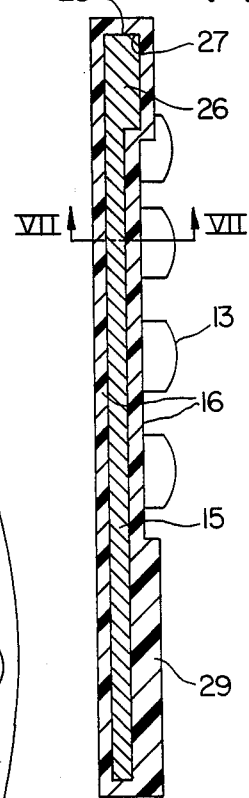
FIG. 4 is a cross-sectional view taken along line IV—IV of FIG. 3.

Referring now to FIG. 3, which is a bottom plan view of the horseshoe only shown in FIG. 1 and to the cross-sectional view of FIG. 4, it is seen that within and as an integral part of the horseshoe is a metal plate 15 that is shaped to conform substantially with the configuration of the perimeter of the horse's hoof. The shape of the metal plate 15 is clearly shown in FIGS. 5 and 6 which are plan and toe end views, respectively. By use of a metal alloy, such as a 6063 T651 aluminum, this metal plate is malleable and can be further shaped by a person knowledgeable in the field of shoeing horses to adapt this generalized shape to conform with the hoof on which it is applied, the hooves in many cases being of different sizes and shapes to a greater or lesser degree. The function of the metal plate is, in part, to accommodate placement and securement of nails through apertures at predetermined points. The metal plate provides a support against which the head of the nail may be driven firmly. The non-linear expansion aspect of the metal assures that the horseshoe cannot elongate and slip beyond the head of the nail, as would certainly occur without this structural element due to the limitations of any elastomeric material to securely sustain any inserted metal part. It is further shown in these figures that the width of the metal plate and the conformity to the general shape of the hoof provides proper support to the horn of the hoof. Furthermore, the configuration of the metal plate 15 in combination with the ascribed thickness of the metal make the functionary role as a restraint against lateral expansion more readily discernible.

The metal plate is made separately and is provided with a reinforcing or thickened pad 26 at the tow end for increasing wear resistance and the useful life of the shoe as will more clearly become apparent below. The toe pad 26 has curved inner and outer edges to conform with the general edge contour of the shoe in the toe area. In the metal plate this pad 26 extends a predetermined amount beyond the outer edge of the main part of the metal plate to provide a greater wear surface area. Pad 26 may have plain bottom and side surfaces, or may be provided with intersecting slots or grooves 27 and 28 in the bottom and edge surfaces respectively, for the purpose of providing filling spaces for the covering material 16 which may be molded around metal plate 15. By this means the continuity of the covering material is not interrupted in the toe area, at least in the slots or grooves, which provides greater retention, or adherence, of the covering material on this part of the metal plate. Even when toe pad 26 is worn somewhat, the covering material in the slots or grooves remains continuous around the toe pad to aid in preventing the covering material from peeling off at the toe.

It has been found that the useful life of the shoe can be increased by providing wear-resistant, or reinforcing, pads in the areas subjected relatively to the greatest abrasive forces in normal use, which in a horseshoe are at the front, or toe, and heel portions. Although the podded cleats of my earlier invention of U.S. Pat. No. 4,616,709 perform well in the manner intended, I have found that the life of the podded cleat shoe can be enhanced by providing pad elements which are more wear-resistant than the cleats at the positions of greatest abrasion. Thus the podded cleats at the toe are replaced by pad 26. However, the distance pad 26 protrudes from the bottom surface of metal plate 15 is less than the maximum distance podded cleats 13 protrude when uncompressed by an amount which allows the cleats to compress fully or substantially fully during use so that the shock-absorbing function of the cleats is retained.

The wear-resistant pads 29 on the heel portions of the shoe are preferably formed of solid resilient material integral with the covering material 16. Heel pads 29 can be of the same elastomeric or polymeric material as the covering material or may be of a harder rubber or other resilient material bonded to, or incorporated in during molding of, the bottom layer of covering material. Heel pads 29 may also be metal integral with metal plate 15 similarly to the toe pad 26, although the latter embodiment is not illustrated in the drawings. As with toe pad 26, heel pads 29 protrude a shorter distance from the bottom of the shoe than podded cleats 13 to preserve the shock-absorbing function of the cleats.

The complete shoe of this invention is made by first producing metal plate 15 from a suitable material, preferably aluminum, if a light shoe is desired, machining or otherwise forming grooves or slots 27, 28 in toe pod 26, and drilling holes 22 therethrough. Outer covering 16 is then formed, preferably by molding, around metal plate 15 to enclose the latter in the covering material, the resultant shoe being of laminated construction with the outer covering securely bonded to the metal plate. The upper and lower layers of covering 16 can also be separately formed and attached to metal plate 15 by a suitable bonding technique. Openings 22 in the metal plate are aligned in position with chambers 19 in the finished shoe. In order to create these internal chambers in the embodiment wherein covering 16 is molded around plate 15, cores or pins (not shown) are used in the molding operation inserted through each hole 22 around which podded cleats 13 are formed. Elastomeric material formed inside apertures 22 is chemically bonded to the metal plate during the molding process; as is also the additional rubber that may extend beyond the perimeter of the metal part, as a protective measure to prevent any edges of the metal which may be sharp from injuring the horse.

Figure 7:
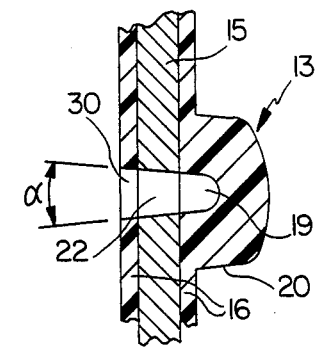
FIG. 7 is an enlarged cross-sectional view taken along line VII—VII of FIG. 4 and showing another embodiment of a podded cleat in accordance with this invention.

FIG. 7 shows another embodiment of the podded cleat wherein the sidewalls of the chamber 19, holes 22 and corresponding aligned holes 30 through the upper layer of covering 16 form the surface of a truncated cone having a predetermined apex angle $\alpha$ which provides the desired compressibility of the cleats in accordance with the particular material of covering 16 and the size of the chamber. A suitable apex angle α for general purposes may be 10°, for example.

In another method of producing the horseshoe of this invention, the holes 22 and 30 and chamber 19 can be formed after metal plate 15 is enclosed within covering 16 by drilling, for example.

FIG. 8 is a side view of another form of podded cleat of this invention wherein the cleat is formed independently of the metal substrate or plate 15 and covering 16. In this embodiment, separate compressible cleats 13' are provided with an attaching shank 23 formed as an integral section. This insertable shank 23 may be a threaded hollow stem or other type of fastener found suitable for securement. If shank 23 is threaded, hole 22 is also threaded as well as the corresponding holes through covering 16 (not shown), if desired, to cooperatively engage with the threaded shank to retain cleat 13' on the shoe in use. The purpose in forming the podded cleats as separate but securely fastened components is to allow replacement of the cleats without necessitating removal of the metal interrelated horseshoe.

As previously shown in the drawings, all cleats maintain an internal chamber 19 and encompassing wall 20 to completely facilitate the mode of compression for the cushioning effect. As can be gleaned from the figures, there may be variances in the shape, contour and form of the cleats that can be determined in keeping with the invention.

Referring now to FIG. 9, which is an enlarged partial side view of the arrangement shown in FIGS. 1 and 2a, there is shown a further embodiment wherein the podded cleat has a metal cap 24, which may be chemically and permanently bonded to the cleat. Although the cleat is fully compressible due to the action of an internal core 19 and the surrounding wall 20 that is related in form, the metal caps increase resistance to abrasive wear and provide additional longevity for the horseshoe and protection of the elastomeric material.

It is to be understood that the invention is not limited to the drawings and description herein, which are merely illustrative of the best modes of carrying out the invention, ans which are suitable in modification of form, arrangement, materials and details, but rather is intended to encompass all such modifications which are within the spirit and scope as defined by the claims.

I claim:

1. A horseshoe comprising:
a base member for attachment to a horse's hoof on the lower part thereof;
a bottom surface on said base member having toe and heel portions;
a plurality of podded cleats protruding generally downwardly from said bottom surface of said base member in spaced relationship along at least part of the area of said bottom surface adjacent the peripheral region thereof to support the horn of the hoof around at least part of the peripheral region of the hoof, each podded cleat comprising a pod of elastomeric material only protruding from the bottom surface of said base member and formed by a hollow cavity within said pod having a size and shape relative to the dimensions of said pod, and a wall surrounding said cavity which is unconfined and facilitates substantial compression of the pod under impact and compressive load by mechanical collapse of said wall to maximize cushioning of the impact and load on the horse's hoof in use; and
wear-resistant toe and heel pad means protruding downwardly from said bottom surface at said toe and heel portions respectively.

2. A horseshoe as claimed in claim 1 wherein:
each cleat is in the form of a truncated cone having the larger base thereof adjacent said base member.

3. A horseshoe as claimed in claim 1 and further comprising:
a metal cap attached over a part of the outer surface of each cleat for protection against abrasive wear.

4. A horseshoe comprising:
a rigid metal plate base member having a shape to support the horn of the hoof for attachment to a horse's hoof on the lower part thereof;
a bottom surface on said metal plate base member having toe and heel portions;
a plurality of podded cleats attached to said metal plate protruding generally downwardly from said bottom surface thereof in spaced relationship along at least part of the area of said bottom surface adjacent to the peripheral region thereof to support the horn of the hoof around at least part of the peripheral region of the hoof, each podded cleat comprising a pod of elastomeric material protruding from the bottom surface of said base member and formed by a hollow cavity within said pod having a size and shape relative to the dimensions of said pod, and a wall surrounding said cavity which facilitates substantial compression of the pod under impact and compressive load by mechanical collapse of said wall to maximize cushioning of the impact and load on the horse's hood in use;
holes in said metal plate aligned with said cavities so that said cavities extend through said metal plate; and
wear-resistant toe and heel pad means protruding downwardly from said bottom surface at said toe and heel portions, respectively, said toe pad means comprising a solid metal pad protruding from said metal plate.

5. A horseshoe as claimed in claim 4 wherein:
said heel portions comprise two spaced heel parts; and
said heel pad means comprises a solid resilient pad protruding from each heel part.

6. A horseshoe as claimed in claim 5 wherein:
said base member further comprises a lower layer of elastomeric material on the bottom of said metal plate and attached to said metal plate to form a laminated base member;
said cleats are integral with said lower layer;
holes are provided through said elastomeric material lower layer aligned with said cavities so that said cavities extend through said laminated base member;
said toe pad is integral with said metal plate;
said heel pads are integral with said lower layer of elastomeric material; and
said toe and heel pads protrude from said bottom of said base member a shorter distance than said podded cleats so that said podded cleats at least substantially fully collapse in use.

7. A horseshoe as claimed in claim 6 and further comprising:
an upper layer of elastomeric material attached to the upper surface of said metal plate;
an upper surface and leading edge on said toe pad;

at least one continuous groove in said upper surface and forward edge of said toe pad; and elastomeric material extending in said at least one groove forming at least one continuous connection between said upper and lower layer of elastomeric material.

8. A horseshoe as claimed in claim 7 wherein:
said metal plate is substantially completely enclosed in elastomeric material.

9. A horseshoe as claimed in claim 8 wherein:
said elastomeric material has resilient properties which in combination with the shape and size of said pods and hollow cavities therein restore said cleats to a given form upon release of the compressive load.

10. A horseshoe as claimed in claim 9 wherein:
said cleats are aligned in spaced circumferential array, and vary in size, number and arrangement with respect to said base member and each other to accommodate specific impact and load-bearing forces for specific areas of the hoof.

11. A horseshoe as claimed in claim 9 wherein:
said cleats are aligned in spaced circumferential array, and vary in size, number and arrangement with respect to said base member and each other to accommodate specific impact and load-bearing forces for specific areas of the hoof.

12. A horseshoe as claimed in claim 8 and further comprising:
reinforcing filaments within said elastomeric material for improving resistance to wear and abrasion of the cleats; and wherein
the composition of said elastomeric material promotes resilient displacement of said cleats under compressive load toward said base member.

13. A horseshoe as claimed in claim 12 wherein:
each cleat is in the form of a truncated cone having the larger base thereof adjacent said base member.

14. A horseshoe as claimed in claim 13 and further comprising:
a metal cap attached over a part of the outer surface of each cleat for protection against abrasive wear.

15. A horseshoe as claimed in claim 4 wherein each podded cleat comprises:
a separate cleat having an integral attaching shank thereon;
a screw thread on said attaching shank; and
a screw thread in each hole in said metal plate for threadedly receiving said screw threaded shank of a respective cleat for fastening said cleats to and removing said cleats from said metal plate.

16. A horseshoe as claimed in claim 15 wherein:
said cavity of each cleat extends through said attaching shank thereof.

17. A horseshoe as claimed in claim 4 wherein:
each podded cleat is a separate cleat; and
cooperating means are provided on said metal plate and said separate cleats for removably fastening said cleats to said metal plate.

18. A horseshoe as claimed in claim 4 and further comprising:
a metal cap attached over a part of the outer surface of each cleat for protection against abrasive wear.

19. A horseshoe as claimed in claim 4 wherein
said elastomeric material has resilient properties which in combination with the shape and size of said pods and hollow cavities therein restore said cleats to a given form upon release of the compressive load.

20. A horseshoe comprising:
a rigid metal plate base member having a shape to support the horn of the hoof for attachment to a horse's hoof on the lower part thereof;
a bottom surface on said metal plate base member having toe and heel portions;
a plurality of podded cleats attached to said metal plate protruding generally downwardly from said bottom surface thereof in spaced relationship along at least part of the area of said bottom surface adjacent the peripheral region thereof to support the horn of the hoof around at least part of the peripheral region of the hoof, each podded cleat comprising a pod of elastomeric material protruding from the bottom surface of said base member and formed by a hollow cavity within said pod having a size and shape relative to the dimensions of said pod, and a wall surrounding said cavity which facilitates substantial compression of the pod under impact and compression load by mechanical collapse of said wall to maximize cushioning of the impact and load on the horse's hoof in use;
holes in said metal plate aligned with cavities so that said cavities extend through said metal plate; and
wear-resistant toe and heel pad means protruding downwardly from said bottom surface at said toe and heel portions, respectively, said heel portions comprising two spaced heel parts, and said heel pad means comprising a solid resilient pad protruding from each heel part.

* * * * *